United States Patent
Anbarci et al.

[19]

[11] Patent Number: 5,853,786
[45] Date of Patent: Dec. 29, 1998

[54] PROCESS FOR CONTINUOUS PRODUCTION OF PROCESSED CHEESE

[75] Inventors: Ahmet Anbarci, Unterhaching; Josef Sebastian Nassauer, Langenbach; Stephan Simburger, Munchen, all of Germany

[73] Assignee: Kraft Foods, Inc., Northfield, Ill.

[21] Appl. No.: 612,899

[22] PCT Filed: Jul. 6, 1995

[86] PCT No.: PCT/GB95/01591

§ 371 Date: Apr. 5, 1996

§ 102(e) Date: Apr. 5, 1996

[87] PCT Pub. No.: WO96/01567

PCT Pub. Date: Jan. 25, 1996

[30] Foreign Application Priority Data

Jul. 7, 1994 [DE] Germany .................. 44 23 988.2

[51] Int. Cl.[6] .................................... A23C 19/08
[52] U.S. Cl. .................. 426/582; 426/231; 426/519; 426/522; 99/452; 99/453
[58] Field of Search .................. 426/105, 231, 426/232, 581, 582, 399, 519–524, 233; 99/452–455; 73/54.01, 54.07, 54.43; 366/136, 137, 142, 336; 422/132

[56] References Cited

U.S. PATENT DOCUMENTS

| | | | |
|---|---|---|---|
| 3,930,402 | 1/1976 | Detmar et al. | 73/55 |
| 3,977,235 | 8/1976 | Topham | 73/54 |
| 4,112,131 | 9/1978 | Bosy et al. | 426/582 |
| 4,447,464 | 5/1984 | Schwartz et al. | 426/663 |
| 4,478,071 | 10/1984 | Lecacheux et al. | 73/55 |
| 4,627,271 | 12/1986 | Abbott et al. | 73/55 |
| 4,664,859 | 5/1987 | Knoop | 264/102 |
| 5,079,024 | 1/1992 | Crane | 426/573 |
| 5,180,604 | 1/1993 | Crane et al. | 426/582 |
| 5,257,528 | 11/1993 | Degouy et al. | 73/53.01 |
| 5,470,595 | 11/1995 | Kopp et al. | 426/582 |

FOREIGN PATENT DOCUMENTS

| | | |
|---|---|---|
| 2061190 | 8/1992 | Canada . |
| 0 083 524 A1 | 7/1983 | European Pat. Off. . |
| 0 435 713 A1 | 7/1991 | European Pat. Off. . |
| 0 437 252 A2 | 7/1991 | European Pat. Off. . |
| 0 499 041 A1 | 8/1992 | European Pat. Off. . |
| 0 526 086 A1 | 2/1993 | European Pat. Off. . |
| 29 13 652 A1 | 10/1980 | Germany . |
| 90 02 041.3 | 6/1990 | Germany . |
| 411 550 | 11/1966 | Switzerland . |

*Primary Examiner*—William H. Beisner
*Attorney, Agent, or Firm*—Fitch, Even, Tabin & Flannery

[57] ABSTRACT

The present invention provides a process for continuous production of cheese products in which: a) an essentially homogeneous liquid product stream is produced from the starting materials necessary to produce the cheese product; b) the liquid product stream is, if desired, subjected to heat treatment; c) the product stream is, if desired, cooled down to a temperature suited for setting viscosity; d) the viscosity of the liquid product stream is set to a desired value by directing all or part of the product stream through a closed circulation system, at least at the beginning of the process, and in the process, subjecting it to a shear force; and e) the product stream is diverted from the circulation system and, after any desired further treatment and/or interim storage is removed as a finished product.

12 Claims, 2 Drawing Sheets

PROCESS FOR CONTINUOUS PRODUCTION OF PROCESSED CHEESE

FIELD OF THE INVENTION

The present invention pertains to a process for the continuous production of cheese products and equipment suited for carrying out this process.

BACKGROUND ART

For producing processed cheese spread according to the prior art, a product stream is initially formed from the starting materials needed, i.e., a cheese component (natural cheese, processed cheese spread, or mixtures of the two) and possibly one or more additional components, such as butter, other milk products, water, emulsifiers, or melting salts such as phosphates or citrates, preservatives, table salt, and colorings. For this purpose, these starting materials are typically comminuted in a mixing device and subsequently brought to a liquid state by heating. The temperature in this stage lies between the melting point of the product mixture and 100° C., typically in the range of from about 70° C. to about 90° C. Subsequently, the liquid product stream may be heated to ultra-high temperatures in order to kill bacteria, that is to say, there is a brief heating to temperatures above about 100° C. under elevated pressure. The ultra-heat-treated product stream is subsequently cooled down by, for instance, being subjected to a flash cooling process, that is, it is cooled down to below 100° C., for instance, to a temperature of from about 85° C. to about 90° C., with simultaneous pressure lowering or release.

As a result of the ultra-high heat treating and the subsequent cooling, the texture of the product is lost. The consequence of this is that, in at least one subsequent step in a starting phase of the processed cheese spread production process, a rework material that has not been ultra-high heat treated (also known as "starter material") must be added to the liquid product stream in a creaming tank in order to set a desired viscosity. Without the addition of rework material during the starting phase of the process, it is not possible to set the viscosity in a creaming tank of the known type within a time frame that is acceptable for production. After setting the desired viscosity, the product stream is diverted from the creaming tank and further processed into the end product by, for instance, being directed through a filling facility and a refrigerating tunnel and subsequently into a palletizing facility.

A disadvantage of the process for producing processed cheese spread known from the prior art is that, at least in a starting phase of the process, a non-sterile starter material must be added in order to set the viscosity of the product stream to a desired value, which will lead to an end product with a desired consistency. This addition of incompletely sterile material causes the risk of possible contamination of the product by bacteria and can result in poor preservability of the product. Another disadvantage of the conventional process is that the creaming tank used for setting the viscosity of the product stream has a large volume of roughly 500 l and that in case of disruption of the product removal process (difficulties in the filling facility, for instance) it is not possible to prevent the viscosity of the product stream in the creaming tank from rising above the desired value. This can lead to fluctuations in the consistency of the product or possibly to losses in production. Moreover, deposits form in the creaming tanks, build up in the ridges on the walls and the stirring device, and lengthy and expensive cleaning measures must be taken at frequent intervals.

In processes for producing other cheese products in which a liquid product stream is generated, which is then processed into an end product with the desired consistency by setting the viscosity of the flowing product stream to the desired value, e.g., in the production of fresh cheeses or processed cheese spreads which are not subjected to ultra-high heat treating, there are also problems in controlling the velocity of the liquid product stream.

Thus, for instance, the process parameters in the production of fresh cheese are dependent on the quality of the milk used as the starting material, which may, for instance, vary considerably due to seasonal fluctuations. In case of incorrect viscosity setting of the liquid product stream, considerable fluctuations of quality and consistency appear in the end product, as well as a lower filling efficiency or utilization of the plant. An attempt has been made in the prior art to solve these problems by intervention at multiple points in the process, as well as by variation of the culturing time or pH adjustment. It is evident, however, that the simultaneous performance of different modification measures at multiple points in the process is complicated and expensive and, moreover, often does not lead to reproducible results with regard to the viscosity of the product stream.

Even in the production of processed cheese spreads that are not ultra-high heat treated there are problems in achieving a constant and consistent viscosity of the product stream.

SUMMARY OF THE INVENTION

The problem underlying the present invention is therefore to avoid at least some of the disadvantages of the prior art described above. This problem is solved in that the viscosity setting of the liquid product stream is effected by a shearing action on the product stream inside a closed circulation system.

According to the present invention there is provided a process for the continuous production of cheese products, which comprises:

producing an essentially homogeneous liquid product stream from the starting materials necessary to produce the cheese product;

setting the viscosity of the liquid product stream to a desired value by directing all or part of the product stream through a closed circulation system, at least at the beginning of the process, and in the process, subjecting it to a shear force; and diverting the product stream from the circulation system.

The invention further provides an apparatus for adjusting the viscosity of a liquid product stream, comprising:

means for producing an essentially homogeneous liquid product stream from the necessary starting materials; and a closed circulation system, through which all or part of the liquid product stream can be directed and, thereby subjected to a shear force in order to set the viscosity to a desired value.

It is further contemplated to provide a method for determining the dynamic viscosity of a liquid stream in which a pressure drop is measured in at least one part of the liquid stream in a measuring path with constant flow resistance under conditions of constant temperature and constant flow rate, or under conditions standardized to constant temperature and constant flow rate, and in which the dynamic viscosity is ascertained from the acquired value of the pressure drop.

The present invention thus provides a process for continuous production of cheese products in which a) an essentially homogeneous liquid product stream is produced from the starting materials necessary to produce the cheese product;

b) the liquid product stream is, if desired, subjected to a heat treatment;

c) the product stream is, if desired, cooled down to a temperature suited for viscosity adjustment, d) the viscosity of the liquid product stream is set to a desired value by directing all or part of the product stream through a closed circulation system, at least at the beginning of the process, and in the process, subjecting it to a shear force; and e) the product stream is diverted from the circulation system and, after any desired further treatment and/or interim storage, is removed as a finished product.

The process of the invention can be employed For producing fresh cheese and processed cheese spread, particularly ultra-high heat-treated processed cheese spread.

The process of the invention can be employed for continuous production of fresh cheese products. In step a) in this case, a liquid product stream is produced from the starting materials required for the production of fresh cheese, namely milk, cream, skim or part skim milk, with the possible addition of one or more cheese-making additives, using known process measures involving, in particular, a microbial-fermentation treatment and a subsequent separation step. Using steps b) and c) of the process of the invention, this product stream can, if desired, be subjected to a heat treatment by, for instance, being heated to a temperature of from about 60° C. to about 85° C. and, to the extent required, can be subjected to a subsequent cooling to a temperature suitable for setting the viscosity for the specific product. The heat treatment and subsequent cooling are not obligatory in the production of fresh cheese products, however.

Steps a), b), and c) of the process of the invention can be performed for fresh cheese production as for techniques known from the prior art.

The present invention also pertains to a process for the continuous production of processed cheese spread. Here, step a) of the process of the invention includes the production of an essentially homogeneous liquid product stream from the starting materials necessary for the processed cheese spread. These starting materials are, as already mentioned above, a cheese component and additional optional components intended for the production of specific types of processed cheese spread. The starting materials are mixed and brought to the liquid state by heating. This step does not differ from previously known processes.

Step b) of the process of the invention for producing processed cheese spread preferably includes a brief heating of the liquid product stream to a temperature above about 100° C. under elevated pressure; such a treatment constitutes ultra-high heat treatment of the product stream. In this step, the temperature of the product stream is preferably raised above about 120° C., more preferably above about 130° C., and most preferably to approximately 140° C., with pressure being sufficient to keep the product stream overall in a liquid state. The absolute pressure preferably lies in a range of from about 3 bar to about 4 bar, with about 3.5 bar being especially preferred. The period of heating is sufficient, on the one hand, to provide as complete a killing as possible of the bacteria present in the product stream, but not so long, on the other hand, as to affect adversely the properties of the final product as a result of any lack of thermal stability of the components of the product stream. This period preferably amounts to from about 5 seconds to about 30 seconds, with from about 8 seconds to about 20 seconds being especially preferred. It should be noted, however, that the process of the invention is also suited to the production of processed cheese spreads that are not ultra-high heat treated.

Step c) of the process of the invention includes the cooling of the ultra-high heat treated product stream to a temperature of less than about 100° C., if ultra-high heat treating occurred in step b) In this case the product stream in this cooling step is preferably cooled to a temperature of from about 80° C. to about 90° C. The cooling is preferably effected using a flash cooling step in which the ultra-high heat-treated product stream is rapidly cooled down. The pressure reduction in the flash cooling process preferably goes from the pressure prevailing during the ultra-high heat treating to a subatmospheric pressure level within a short time span of less than about 1 second.

Steps b) and c) of the process of the invention can also be performed in processed cheese spread production as in known techniques from the prior art.

Step d) of the process, which is essential to the invention both for the production of processed cheese spread and for the production of fresh cheese, includes the setting of a desired viscosity of the cooled liquid product stream by directing all or part of the cooled product stream through a closed circulation system, at least in a starting phase of the process and at the same time subjecting it to a shear force, at least inside the circulation system. Surprisingly, it was determined that directing or pumping the product stream through a closed circulation system assures a sufficient and rapid setting of the desired viscosity of the liquid product stream, both in the production of processed cheese spread and in the production of fresh cheese.

For processed cheese spread production there is an advantage of process step d) particularly in the fact that no external starter material need be added. With the process of the invention, it is also possible to avoid a treatment of the product stream in a creaming tank of the type used in the prior art, so that any disruption of the product removal system does not result in any losses. For fresh cheese production there is an advantage of process step d) particularly in the fact that instead of the interventions at several points in the process as per the prior art, a single process measure suffices to set a constant and consistent viscosity. In addition the viscosity setting can be done shortly before packaging the product, which leads to the advantage that no unintentional and unpredictable variation in viscosity can occur between setting the viscosity and packaging the product.

When conducting the process of the invention, it has proven advantageous, at least in the starting phase of the process, when setting the desired viscosity, for the flow rate of the product stream inside the circulation system to be kept considerably higher than the flow rate of the product stream introduced into or drawn out of the circulation system. The ratio of the flow rate of the product stream inside the circulation system (total circulating quantity) to the flow rate of the product stream introduced into or drawn out of circulation system is preferably greater than about 5:1 and most preferably greater than about 10:1 or more. Thus it can be about 10:1 up to about 30:1, for instance. The temperature of the liquid product stream inside the circulation system is preferably kept at a constant value in the range of from about 75° C. to about 95° C., most preferably about 80° C.

In a preferred process in accordance with the invention for producing ultra-high heat-treated processed cheese spread products, no starter material from the outside is added to the product stream, at least on the path of the product stream from the ultra-high heat treating step to the removal of the end product. This can be achieved, for instance, by keeping the product stream isolated from the environment in this process section and inside the circulation system. By avoiding the addition of non-sterile starter material, the sterility of the ultra-high heat-treated product stream is guaranteed until the removal of the end product, which yields a considerably improved preservability of the end product.

In order to monitor and/or regulate the viscosity of the product stream, the resulting viscosity is preferably measured and the amount of the shear force is regulated according to the viscosity measurement. In this case it is preferred that the measurement and regulation of the viscosity should be done inside the circulation system. The viscosity of the product stream can be regulated, for instance, by setting a residence time of a volume unit of the product stream in a shear force region located in the circulation system. This shear force region located in the circulation system preferably contains a shearing device that can produce a shear force on the product stream. Examples of preferred shearing devices include colloid mills or similar rotor-stator systems, homogenizers, or static mixers.

The degree of shearing in the circulation system can be regulated by setting the ratio of the circulation system flow rate to the rate of removal of the product stream from the circulation system. The degree of shearing can also be regulated by varying the amount of shearing energy introduced per unit time in a shear force region inside the circulation system. It is clear to a person skilled in the art that the viscosity of the product stream can also be set by a combination of several or all of the aforesaid measures. The amount of shear force can, for instance, be reduced after the starting phase for steady-state operation down to 0, if desired, perhaps when the desired viscosity value of the product stream has already been reached or if, for instance, a lower speed of the viscosity setting is desired in the product stream in case of a disruption of the removal process.

Step e) of the process of the invention includes the diversion of the product stream from the circulation system and, after any desired further treatment and/or interim storage, the removal of the end product. This step corresponds to the process known from the prior art, so that there is no need to describe this further here.

In the process of the invention, all or part of the product stream is directed through the closed circulation system. Thus, in a preferred process according to the present invention, a part of the product stream can be diverted (for instance, after flash cooling in the production of process cheese spread) and pumped through a closed circulation system under shearing conditions. In this case, setting of viscosity initially take place in only one part of the product stream. This part of the product stream can then, as in the prior art, be combined with the remainder of the product stream in a creaming tank, in which the viscosity of the entire product stream is set. This embodiment has the advantage over the prior art that the addition of external starter material is not necessary.

Of course, the presence of a creaming tank is not required. Instead, in a further preferred process in accordance with the invention, the entire stream can be directed exclusively through the closed circulation system in order to set the desired viscosity there. The product stream can then be diverted from the circulation system and removed as end product.

In a preferred process according to the present invention the liquid product stream is directed through a circulation system with a variable circulating volume. The varying of the circulating volume can be done, for instance, by opening or closing one or more additional circulation loops and/or by connection of a closed tank or tanks with level regulation The amount of product directed through the circulation system can be varied simply and quickly by means of this enlargement or reduction of the circulating volume. In that way the process of the invention can be adapted to varying operating parameters, for instance, variations regarding the speed of the viscosity setting of the product stream inside the circulation system or variations regarding the desired amount of product. Thus, for instance, during the starting phase of the process, in which an optimally high speed for setting the viscosity in the product stream is required, a small circulating volume can be used, which means that the integrated residence time of a volume unit of product stream in a shear region located in the circulation system is elevated. During steady-state operation, when no such high speed for the setting of viscosity of the product stream located in the circulation system is needed, the circulating volume can then be raised again, for instance, by opening an additional circulation loop in order to provide a larger product flow rate. It should be noted in this context that the measure of expanding or reducing the circulating volume can also be performed in combination with other measures for regulating viscosity, for instance, regulating the intensity of the shearing and/or the ratio of the circulation system flow rate to the rate of diversion of the product stream from the circulation system.

In a particularly preferred embodiment the cooled liquid product stream is fed to the circulation system by way of at least one storage vessel. This storage vessel is preferably located between the area arranged for ultra-high heat treating and the closed circulation system of the present invention.

A cooling tank used for an optional cooling procedure (for instance, a flash cooling procedure) can be used as the storage vessel. Preferably, however, a storage vessel is used which is located between the cooling tank and the circulation system. In contrast to the creaming tank known from the prior art, there is essentially no setting of viscosity for the product stream in the storage vessel. This implies that there is no addition of starter material that has not been ultra-high heat treated, so that the product stream can be kept in the storage vessel or vessels for a relatively long time due to the fact that its viscosity does not vary significantly over time.

One objective of the storage vessel or vessels, is a compensation of the amount of starter material input into the process and the amount of product removed. In the starting phase of the process, for instance, a surplus of accumulating cooled liquid product stream in relation to the product stream diverted from the circulation system can be compensated for by the appropriate variations in the filled volume in the storage vessel or vessels. Furthermore, any possible surplus of the cooled liquid product stream in relation to the product stream diverted from the circulation system occurring in steady-state operation due to, for example, a reduced rate of removal of the end product, can be compensated for by the appropriate variations in the filled volume in the storage vessel or vessels. Finally it is possible largely to discontinue the shearing action, at least during a phase of reduction of the flow of the product stream from the cooling step after the ultra-high heat treatment until the introduction of the product stream from the storage vessel or vessels into the circulation system. During the appearance of a surplus of the product stream, for example, a circulation can be maintained in the circulation system, where, if desired, it is possible for the amount of shear force in the circulation system to be modified according to a viscosity measurement in order to maintain a desired viscosity.

It should be noted in this context that the storage space can be advantageously used in the production of both processed cheese spread products and fresh cheese products.

An additional object of the present invention is an apparatus for setting the viscosity of a liquid product stream. This apparatus, which is also suited to conducting the process of the invention, includes:

a) means for producing an essentially homogeneous product stream from the necessary starting materials;

b) means, if desired, for heating the liquid product stream;

c) means, if desired, for cooling the product stream down to a temperature suited for setting viscosity;

d) a closed circulation system, through which all or part of the cooled liquid product stream is directed and, in the process, subjected to a shear force in order to set a desired viscosity; and e) if desired, means for product removal.

The apparatus of the invention is intended for the processing of a liquid product stream with a defined shear force, in order to set a desired viscosity of the product stream, that is, to raise or lower the viscosity of the product stream to the desired extent. The apparatus of the invention is particularly suited to the production of cheese products such as processed cheese spread or fresh cheese, but also, for instance, to the production of chocolate products.

The essential characteristic of the invention is the closed circulation system, through which all or part of the liquid product stream is directed at a temperature suitable for setting the viscosity and in the process is subjected to a defined shear force in order to set the desired viscosity. A product stream with the desired viscosity and the desired temperature can thus be produced in a simple way which is subsequently preferably sent directly to the product removal means.

The closed circulation system preferably contains measuring means for the viscosity to be set and a regulation means for the amount of shear force according to the viscosity measurement. It is also preferred that the circulation system contains a shear force region in which the application of shear force to the product stream can be performed. Examples of suitable shear force devices have already been mentioned. Beyond that, the circulation system may also contains means for measuring the temperature and flow rate of the product stream.

The circulation system may also be arranged to accommodate a variable volume of product stream by, for instance, providing means for expanding or reducing the circulating volume. These means may, for instance, include one or several additional circulation loops which may or may not be connected as needed.

In a preferred embodiment of the invention, the apparatus also includes a storage vessel or vessels, through which the cooled liquid product stream is fed to the circulation system, whereby it is especially preferred for the storage vessel or vessels to be arranged to accommodate a variable volume of the product stream. It is therefore possible to assure a compensation feeding of the starter materials and removal of the end product, if such is necessary, for instance, during the starting phase of the process or in case of disruptions in the product removal system.

It is also preferred that the apparatus of the invention be constructed as a system isolated from the environment, at least in the vicinity of the means for cooling (e.g., the means for rapid cooling and simultaneous pressure relief of an ultra-high heat-treated product stream in processed cheese spread production) and the closed circulation system, as well as in the area of the means for removal, if desired, and in the area of the vessel or vessels, if present.

DETAILED DESCRIPTION OF THE DRAWINGS

Figure 1:
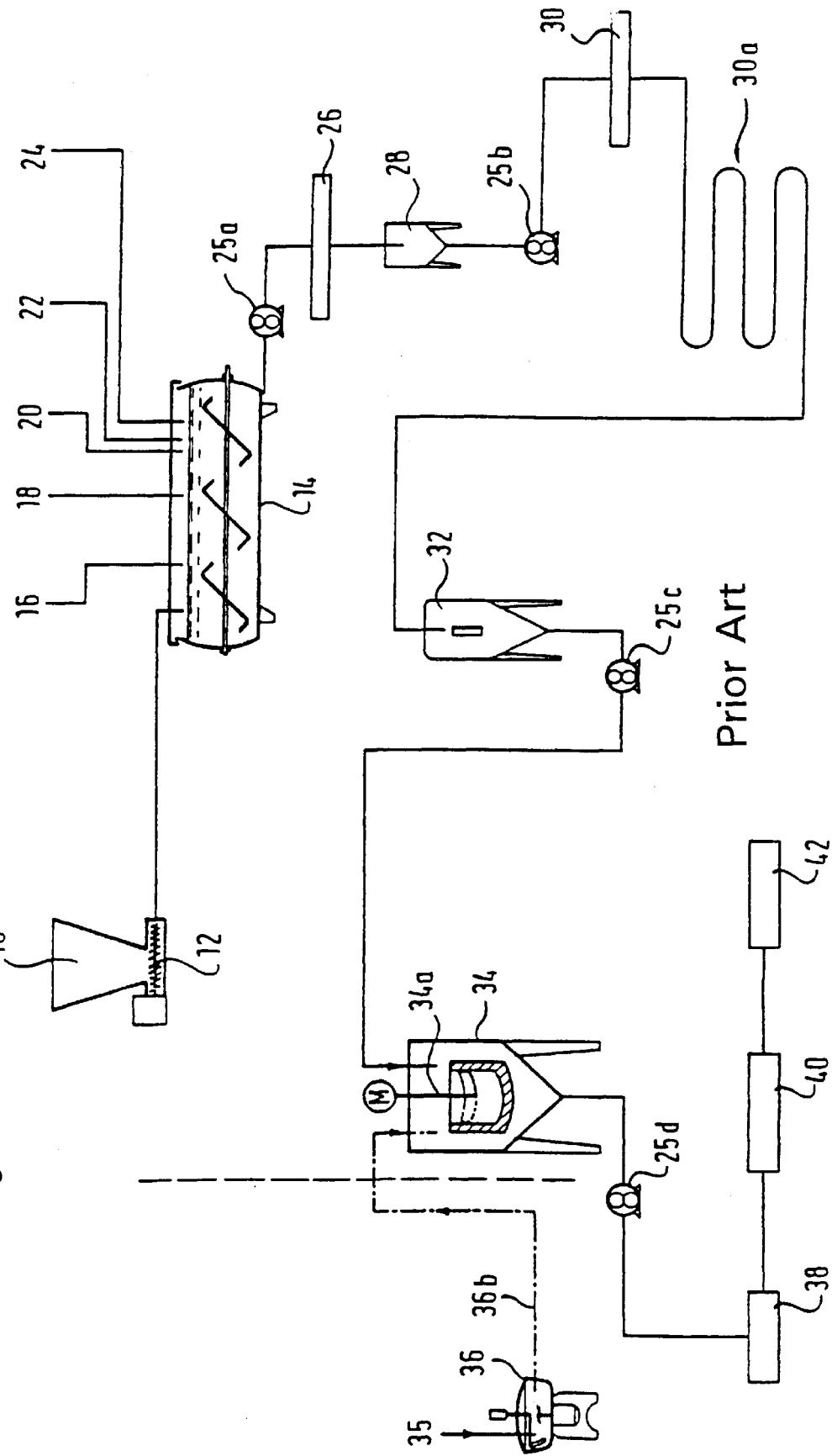
FIG. 1 shows a representation of a processed cheese spread production plant using a process according to the prior art.

Referring to FIG. 1 the cheese 10 (natural cheese, for instance) used in the production of processed cheese spread as starter material is comminuted in a shredder or grinder 12 and fed to a mixer 14 where other components, such as butter 16, powdered milk 18, water 20, salts 22, for example, emulsifying or melting salts (phosphates or citrates) and/or table salt, as well as preservatives and colorings 24 can be added, if desired. The resulting mixture is directed via a pump 25a to a heating unit 26, an injector, for instance, operated, for example, by steam, and is heated in a first heating stage to a temperature of preferably 70° C. to 90° C. and liquefied. The liquid product stream is subsequently directed into an optional preliminary container 28, is then brought to an elevated pressure level of, for instance, 3.5 bar by means of a pump 25b, and is directed to an additional heating unit 30. Ultra-high heat treating to more than 100° C. for a defined time period can then be performed, with the ability of obtaining a precisely specified heating time period by maintenance in a holding loop 30a.

Subsequently, a rapid temperature reduction to below 100° C., combined with pressure relief by preferably 3 bar down to a subatmospheric level, can take place in a flash tank 32. The product stream is then directed with the assistance of a pump 25c into a creaming tank 34, which is equipped with a stirrer 34a. The viscosity of the product stream is then adjuster, using rework material 35 that has not been ultra-high heat-treated but is heated to a temperature of roughly 75° C. to 90° C. in a heating device 36 and fed via a line 36b to the creaming tank, so that a defined ratio of rework material to ultra-high heat treated product stream is produced.

After adjusting the viscosity to a desired value in the creaming tank, the product stream is directed from there by means of a pump 25d to an end product removal system, including, for example, a filling system 38, a refrigerating tunnel 40, and a palletizing facility 42.

Figure 2:
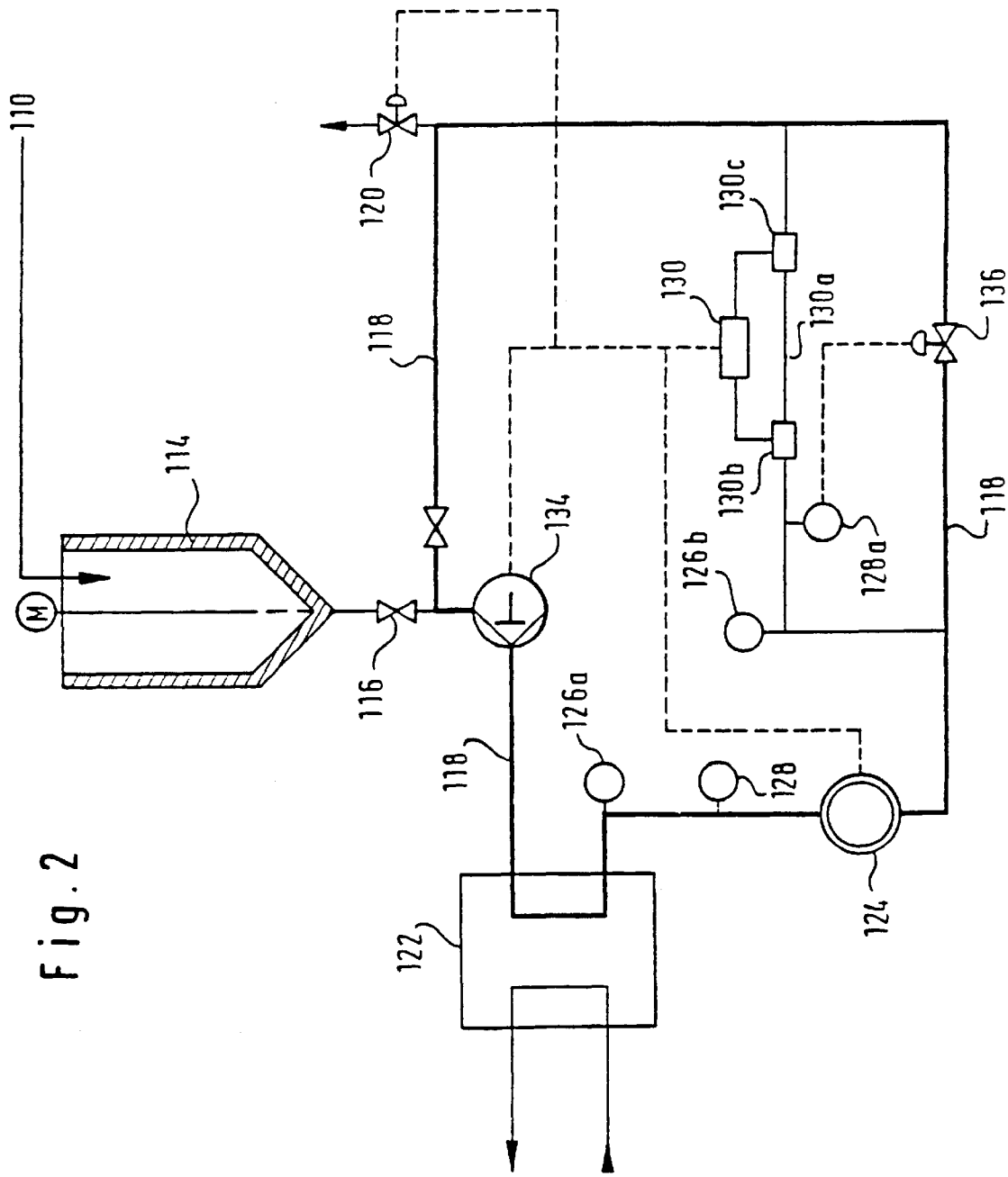
FIG. 2 shows an embodiment of a closed circulation system utilized in the process of the invention.

FIG. 2 illustrates a plant using a preferred process in accordance with the invention, using a closed circulation system. The product stream coming from the flash tank (reference numeral 32 in FIG. 1) is directed via line 110 into a storage tank 114, which is arranged for accommodating a variable amount of the product stream. From there the product stream is directed through a valve 116 into a circulation system 118 drawn with a thick line. As an example, 200 l/h of liquid cheese at a temperature of slightly more than 80° C. are fed via the preliminary container 114 to the circulation system 118. Roughly the same amount of product accumulates at the outlet 120 of the creaming circulation system 118 in a given time under normal operating conditions. The flow rate in the creaming circulation system is roughly 3500 l/h and therefore higher by a factor of roughly 18 than the feed or removal rate.

The circulation system 118 also contains a heat exchanger 122, which keeps the temperature in the circulation system in a desired range of preferably about 80° C. The circulation system also contains a shear force device 124, as well as temperature measuring equipment 126a, 126b, flow rate measuring equipment 128, 128a, and a measuring apparatus 130 for determining the pressure loss. Such measuring equipment can also be provided outside the circulation system.

In the starting phase of the process, the pressure loss (which is a measure for the viscosity of the product stream)

is roughly 100–200 mbar on the integrated on-line measurement apparatus 130 and rises in the course of the creaming to a value of 500 mbar or more. During this on-line measurement, the flow rate through the measuring path 130a is held constant (at roughly 200 l/h) by means of a regulating valve 136. After setting a desired viscosity value of the product stream in the circulation system, the outlet control valve 120 is automatically opened. The valve closes again whenever the desired viscosity value in the circulation system 118 is not achieved despite the viscosity regulation in the circulation system 118.

The maintenance of the desired viscosity value in the circulation system can be regulated by the size of the shear force. Regulation means are provided for this purpose and may include, in particular, a pump 134 and/or a shear force device 124. The size of the shear force can be increased by, for instance, an increase in the flow rate in the circulation system 118, an increase in the shear force in the shear force device 124, or a combination of both measures. These regulation means may of course also serve to reduce the size of the shear force by, for instance, a reduction of the flow rate and/or a reduction of the shear force in the shear force device. In general, the ratio between circulation and outlet flow of the product stream is 10:1 or more. After a product-specific operating period of several days, the facility is emptied and cleaned.

The viscosity setting of the liquid product stream in the circulation system may, moreover, be regulated by expansion or reduction of the circulating volume, possibly in combination with the previously described measures.

Finally, the present invention also pertains to a method or determining the dynamic viscosity of a liquid stream, preferably a liquid stream of variable viscosity, for instance, of a liquid cheese product stream, by measuring the pressure drop in at least one part of the liquid stream in a measuring path with constant flow resistance under conditions of constant temperature and constant flow rate or under conditions standardized to constant temperature and constant flow rate and ascertaining the dynamic viscosity from the acquired value of the pressure drop.

An example of an arrangement for such an on-line viscosity measurement is shown in FIG. 2. In this embodiment the measurement is performed on part of the liquid stream that is carried in the circulation system 118 and diverted from the main stream and directed through a measuring path 130a of constant length, preferably a solid-walled tube with a circular inside wall and constant tube diameter inside the measuring path, with both the temperature of the liquid stream and the flow rate, i.e., the volume of liquid stream per unit time, and hence the velocity profile of the liquid stream across the tube diameter, being held constant. The measurement of the pressure drop in the measuring path 130a is done with two pressure sensors 130b, 130c arranged at the two ends of the measuring path. The diameters of the pressure sensors and of the measuring path may be different, if desired, but are preferably equal. In this case, a preferably laminar flow is present in the measuring path, with a constant velocity field, and the pressure drop observed in structurally viscous liquid streams is directly proportional to the mean dynamic viscosity of the liquid stream under the given flow conditions.

In the embodiment of the viscosity measurement shown in FIG. 2, the constant temperature in the circulation system 118 is set by regulating the inflow temperature for the heat exchanger 122 as a function of the outlet temperature measured at 126a. The constant flow rate is achieved by opening or closing the regulation valve 136 as a function of the flow rate measured at 128a. If the measured flow rate is smaller than the preset desired value, the regulation valve 136 is closed until the desired value is achieved. In case of deviations above the desired value, the same process is performed conversely.

The measurement and regulation of temperature and flow rate in the measuring path can, in principle, be done according to conventionally known methods that are suitable for the respective measuring path and the respective liquid stream.

Thus, it is also possible in a measurement of part of the liquid stream for the regulation of the flow to be performed by diverting a constant volume of product stream over time from the main product stream by means of an appropriate conveyance means. Examples of such suitable conveyance means include vane-cell pumps, gear pumps, and the like. When conducting the viscosity measurement on the entire liquid stream, a constant flow rate can be achieved by, for instance, arranging a speed-regulating pump upstream from the measuring path, so that in case of deviations from the desired value the speed of the pump can be either raised or lowered.

It is also possible, on the other hand, to perform the viscosity measurement according to the invention under non-constant flow rate and temperature conditions, if a standardization of these measurement parameters has been previously performed for the respective liquid stream and the respective measuring path. Such a standardization can be done, for instance, if a calibration curve for the temperature-dependence of dynamic viscosity is prepared for a certain liquid stream and measuring path or if the exact physical connection between temperature-dependence and dynamic viscosity in the respective system can be ascertained volume flow per unit time can be done if a calibration curve of shear gradient and dynamic viscosity is prepared for a certain liquid stream and measuring path or if the physical connection between shear gradient and dynamic viscosity in the respective system can be ascertained in some other way. In this way, a pressure drop measured at a given (non-constant) flow rate or set of temperature conditions corresponds to a precisely defined dynamic viscosity at a reference temperature and a reference shear gradient, so that the pressure drop measured under non-reference conditions can be placed in direct relationship to the dynamic viscosity of the liquid stream under reference conditions.

The on-line viscosity measuring device 130 shown in FIG. 2 uses the method described above, based on a pressure drop measurement along a precisely defined tube path, with volume flow and temperature being held constant. The measuring tube 130a used has a length of 1000 mm and a diameter of 15 mm and the volume flow amounts to 200 l/h. The measurement and regulation of the flow rate is done by the measuring and regulating means 128a, 136.

The temperature range of viscosity measurement for processed cheese spread production according to the embodiment of the present invention shown in FIG. 2 preferably lies between 75 and 90° C., and especially preferably at 78° C.±2° C., although this temperature range can vary with the specific product being used. The measured values for the pressure drop preferably lie in a range of from about 150 mbar to about 1000 mbar, particularly preferably between about 200 and about 300 mbar.

We claim:
1. A process for the continuous production of cheese products, which comprises:

producing an essentially homogeneous liquid product stream from starting materials necessary to produce the cheese product, the starting materials comprising a milk component, selected from the group consisting of milk, cream, skim milk, and mixtures thereof, and one or more cheese making additives;

directing all or part of the liquid product stream through a closed circulation system;

subjecting at least part of the liquid product stream in the closed circulation system to a shear force effective to achieve a desired viscosity;

conducting at least part of the liquid product stream that has achieved the desired viscosity from the closed circulation system;

keeping flow rate of the liquid product stream inside the closed circulation system larger in a starting phase than flow rate of a liquid product stream introduced into or conducted from the closed circulation system;

measuring the viscosity of the liquid product stream in the closed circulation system; and regulating the shear force according to the measured viscosity of the liquid product stream in the closed circulation system in order to maintain the desired viscosity.

2. A process according to claim 1, in which viscosity is measured and regulated inside the closed circulation system.

3. A process according to claim 2, in which a residence time of a volume unit of the liquid product stream inside a shear force region located inside the closed circulation system is regulated.

4. A process according to claim 3, in which the shear force is regulated by adjusting a ratio of a flow rate of the liquid product stream within the closed circulation system to a rate of diversion of the liquid product stream from the closed circulation system.

5. A process according to claim 4, in which the shear force is regulated by varying a rate of shearing energy input into the shear force region inside the closed circulation system.

6. A process according to claim 5 in which the shear force after a starting phase is reduced to 0 when the liquid product stream attains the desired viscosity, for steady-state operation.

7. A process for the continuous production of cheese products, which comprises:

producing an essentially homogeneous liquid product stream from starting materials necessary to produce the cheese product, the starting materials comprising a milk component, selected from the group consisting of milk, cream, skim milk. and mixtures thereof, and one or more cheese making additives;

directing all or part of the liquid product stream through a closed circulation system with a variable circulation volume;

subjecting all or part of the liquid product stream in the closed circulation system to a shear force effective to achieve a desired viscosity;

conducting at least a part of the liquid product stream that has achieved the desired viscosity from the closed circulation system;

using a smaller circulation volume in a starting phase of the process than for steady-state operation;

feeding the liquid product stream into the closed circulation system via a storage vessel or vessels;

compensating for a surplus of the liquid product stream which is accumulating with respect to the closed circulation system in a starting phase of the process by variations in a filling level in the storage vessel or vessels;

compensating for any surplus of accumulating liquid product stream during steady-state operation, which is conducted from the closed circulation system, by variation in the filling level in the storage vessel or vessels;

during an occurrence of a surplus of accumulating liquid product stream, circulation is maintained in the closed circulation system; and, modifying the shear force in the closed circulation system according to a result of a viscosity measurement in order to achieve the desired viscosity.

8. Apparatus for adjusting the viscosity of a liquid product stream, comprising:

means for producing an essentially homogeneous liquid product stream from starting materials necessary to produce a cheese product, the starting materials comprising a milk component, selected from the group consisting of milk, cream, skim milk, and mixtures thereof, and one or more cheese making additives;

a closed circulation system, through which all or part of the essentially homogeneous liquid product stream can be directed and, wherein at least part of the essentially homogeneous liquid product stream is subjected to a shear force effective co achieve a desired viscosity value, means for heating the essentially homogeneous liquid product stream prior to introduction of the essentially homogeneous liquid product stream into the closed circulation system;

means for cooling the essentially homogeneous liquid product stream after it has been heated to a temperature suitable for achieving a desired viscosity of the essentially homogeneous liquid product stream by said heating means prior to directing the essentially homogeneous liquid product stream into the closed circulation system, comprising a region for the means for cooling the essentially homogeneous product stream and a region of the closed circulation system, both of which are isolated from an environment;

means for essentially homogeneous liquid product stream diversion which is constructed as a system isolated from the environment;

means which is part of the closed circulation system which is for measuring the viscosity value of the essentially homogeneous liquid product stream; and means for regulating the shear force according to the viscosity measurement of the essentially homogenous liquid product stream.

9. Apparatus according to claim 8, in which the closed circulation system has a shear force region.

10. Apparatus according to claim 9, in which the closed circulation system is arranged to accommodate a variable volume of essentially homogeneous liquid product stream.

11. Apparatus according to claim 10, which additionally comprises at least one storage vessel through which the essentially homogeneous liquid product stream is fed to the closed circulation system.

12. Apparatus according to claim 11, in which at least one storage vessel is arranged to accommodate a variable volume of essentially homogeneous liquid product stream.

* * * * *

UNITED STATES PATENT AND TRADEMARK OFFICE
CERTIFICATE OF CORRECTION

PATENT NO. : 5,853,786
DATED : December 29, 1998
INVENTOR(S) : ANBARCI et al.

It is certified that error appears in the above-indentified patent and that said Letters Patent is hereby corrected as shown below:

Column 12, line 28, change "co" to --to--.

Signed and Sealed this

Nineteenth Day of October, 1999

Attest:

Q. TODD DICKINSON

Attesting Officer     Acting Commissioner of Patents and Trademarks